US012562005B2

(12) United States Patent
Wang et al.

(10) Patent No.: US 12,562,005 B2
(45) Date of Patent: Feb. 24, 2026

(54) NEURAL NETWORK SYSTEM FOR 3D POSE ESTIMATION

(71) Applicant: Shopee IP Singapore Private Limited, Singapore (SG)

(72) Inventors: Tao Wang, Singapore (SG); Jianfeng Zhang, Singapore (SG); Shuicheng Yan, Singapore (SG); Jiashi Feng, Singapore (SG)

(73) Assignee: Shopee IP Singapore Private Limited, Singapore (SG)

( * ) Notice: Subject to any disclaimer, the term of this patent is extended or adjusted under 35 U.S.C. 154(b) by 233 days.

(21) Appl. No.: 18/561,524

(22) PCT Filed: May 6, 2022

(86) PCT No.: PCT/SG2022/050279
§ 371 (c)(1),
(2) Date: Nov. 16, 2023

(87) PCT Pub. No.: WO2022/245281
PCT Pub. Date: Nov. 24, 2022

(65) Prior Publication Data
US 2024/0233441 A1      Jul. 11, 2024

(30) Foreign Application Priority Data

May 18, 2021    (SG) ............................. 10202105170T
May 29, 2021    (SG) ............................. 10202105716X
Jul. 29, 2021    (SG) ............................. 10202108302R

(51) Int. Cl.
$G06V\ 40/20$        (2022.01)
$G06N\ 3/0455$        (2023.01)
(Continued)

(52) U.S. Cl.
CPC ................ *G06V 40/20* (2022.01); *G06T 7/55* (2017.01); *G06V 10/82* (2022.01); *G06T 2207/20084* (2013.01); *G06T 2207/30196* (2013.01)

(58) Field of Classification Search
CPC .......... G06V 40/20; G06V 10/82; G06T 7/55; G06T 2207/20084; G06T 2207/30196
See application file for complete search history.

(56) References Cited

U.S. PATENT DOCUMENTS 9,053,562 B1 *    6/2015    Rabin ........................ H04S 7/30
9,418,480 B2 *    8/2016    Issa ........................... G06T 7/75
(Continued)

FOREIGN PATENT DOCUMENTS

CN        109977827 A        7/2019

OTHER PUBLICATIONS

Zhu et al , Deformable DETR: Deformable Transformers for End-to-End Object Detection, Mar. 18, 2021 (Year: 2021).*
(Continued)

*Primary Examiner* — Kevin Ky
(74) *Attorney, Agent, or Firm* — David R. Stevens; Stevens Law Group

(57) ABSTRACT

A system for 3D pose estimation of people is described, comprising an encoder neural network configured to extract multi-view image features from 2D input images obtained from different camera views, and a decoder neural network configured to receive the multi-view image features and predict 3D joint locations of the people in the 2D input images. The decoder neural network comprising a projective-attention mechanism configured to: determine a 2D projection of a predicted 3D joint location for the camera views and assign them as anchor points; apply an adaptive deformable sampling strategy to gather localized context
(Continued)

information of the camera views and to learn deformable offsets, and based on the deformable offsets, determine the deformable points for the anchor points; generate attention weights based on the multi-view image features at the anchor points; and apply the attention weights to aggregate the multi-view image features at the deformable points.

9 Claims, 13 Drawing Sheets

(51) Int. Cl.
| | |
|---|---|
| *G06T 7/55* | (2017.01) |
| *G06V 10/82* | (2022.01) |

(56) References Cited

U.S. PATENT DOCUMENTS

| | | | | |
|---|---|---|---|---|
| 9,904,867 | B2 * | 2/2018 | Fathi | G06V 20/70 |
| 11,357,581 | B2 * | 6/2022 | Mozes | A61B 34/76 |
| 2014/0081659 | A1 * | 3/2014 | Nawana | G16H 10/20 |
| | | | | 705/3 |
| 2019/0094542 | A1 * | 3/2019 | Langner | G02B 27/0093 |
| 2019/0347817 | A1 * | 11/2019 | Ferrantelli | G06F 18/217 |
| 2020/0066029 | A1 * | 2/2020 | Chen | G06T 15/205 |
| 2020/0084353 | A1 * | 3/2020 | Wacey | H04N 13/239 |
| 2020/0234466 | A1 | 7/2020 | Holzer | |
| 2021/0295548 | A1 * | 9/2021 | Veiga | G06T 7/73 |
| 2021/0390767 | A1 * | 12/2021 | Johnson | G06F 18/2148 |
| 2022/0274114 | A1 * | 9/2022 | Vazirani | B01L 3/523 |

OTHER PUBLICATIONS

Vasileios Belagiannis, CVF, 3D Pictorial Structures for Multiple Human Pose Estimation, Computer Aided Medical Procedures, Technische Universität München, Germany, CVPR, 2014, pp. 1-8.

Richard Hartley and Andrew Zisserman, Cambridge, Multiple View Geometry in computer vision, Second Edition, Cambridge University Press< New York 2000, 2003, pp. 1-673.

Vasileios Belagiannis, 3D Pictorial Structures Revisited: Multiple Human Pose Estimation, pp. 1-14, 1929-1942, 2015.

Nicolas Carion, End-to-End Object Detection with Transformers, May 28, 2020, pp. 1-26.

Jifeng Dai, Deformable Convolutional Networks, CVF, Microsoft Research Asia, pp. 764-773, ICCV, 2017.

Alexey Dosovitskiy, An Image is Worth 16×16 Words: Transformers for Image Recognition at Scale Published as a conference paper at ICLR 2021, Jun. 3, 2021, pp. 1-22.

Sara Ershadi-Nasab, Multiple human 3D pose estimation from Multiview images, CrossMark, Revised: Jul. 9, 2017 / Accepted: Aug. 20, 2017, © Springer Science+Business Media, LLC 2017, pp. 1-29.

Kehong Gong, PoseAug: A Differentiable Pose Augmentation Framework for 3D Human Pose Estimation, National University of Singapore, CVF, 2021, pp. 8575-8584.

He Chen, Multi-person 3D Pose Estimation in Crowded Scenes Based on Multi-View Geometry, The Johns Hopkins University, USA, National University of Singapore, Singapore, Jul. 21, 2020, pp. 1-17.

Junting Dong, Fast and Robust Multi-Person 3D Pose Estimation from Multiple Views, CVF, pp. 7792-7801, 2019.

Kaiming He, Deep Residual Learning for Image Recognition, CVF, pp. 770-778, 2016.

Yihui He, Epipolar Transformers, CVF, 2020, pp. 7779-7788.

Congzhentao Huang, End-to-end Dynamic Matching Network for Multi-view Multi-person 3d Pose Estimation, University of Technology Sydney, Sydney, Australia, pp. 1-16, 2020.

Karim Iskakov, Learnable Triangulation of Human Pose, Samsung AI Center, Moscow, May 14, 2019, pp. 1-9.

Wen Jiang, Coherent Reconstruction of Multiple Humans from a Single Image, University of Pennsylvania, Jun. 15, 2020, pp. 1-10.

Yifan Jiang, TransGAN: Two Pure Transformers Can Make One Strong GAN, and That Can Scale Up, University of Texas at Austin, Dec. 9, 2021, pp. 1-19.

Hanbyul Joo, Panoptic Studio: A Massively Multiview System for Social Motion Capture, Yaser Sheikh The Robotics Institute, Carnegie Mellon University, pp. 1-9, 2015.

Hanbyul Joo, Panoptic Studio: A Massively Multiview System for Social Interaction Capture, https://domedb.perception.cs.cmu.edu, Dec. 9, 2016, pp. 1-14.

Abdolrahim Kadkhodamohammadi, A generalizable approach for multi-view 3D human pose regression, Oct. 8, 2019, pp. 1-15.

Angjoo Kanazawa, End-to-end Recovery of Human Shape and Pose, University of California, Berkeley, Jun. 23, 2018, pp. 1-10.

Sven Kreiss, PifPaf: Composite Fields for Human Pose Estimation, EPFL VITA lab CH-1015 Lausanne, Apr. 5, 2019, pp. 1-10.

H. W. Kuhn, the Hungarian Method for the Assignment Problem, Bryn Yaw College, pp. 83-97, 1955.

Tsung-Yi Lin, Focal Loss for Dense Object Detection, Facebook AI Research (FAIR), Feb. 7, 2018, pp. 1-10.

Matthew Loper, SMPL: A Skinned Multi-Person Linear Model, Max Planck Institute for Intelligent Systems, Tubingen, Germany, Industrial Light and Magic, San Francisco, CA, pp. 1-16, 2015.

Julieta Martinez, A simple yet effective baseline for 3d human pose estimation, 1University of British Columbia, Vancouver, Canada, Body Labs Inc., New York, NY, Aug. 4, 2017, pp. 1-10.

Dushyant Mehta, VNect: Real-time 3D Human Pose Estimation with a Single RGB Camera, To Appear in ACM TOG (SIGGRAPH 2017), Max Planck Institute for Informatics, May 3, 2017, pp. 1-13.

Xuecheng Nie, Single-Stage Multi-Person Pose Machines, Department of Electrical and Computer Engineering, Aug. 24, 2019, pp. 1-10.

George Papandreou, PersonLab: Person Pose Estimation and Instance Segmentation with a Bottom-Up, Part-Based, Geometric Embedding Model, Google Research, Los Angeles, USA, Springer Nature Switzerland AG 2018, pp. 282-299.

Georgios Pavlakos, Harvesting Multiple Views for Marker-less 3D Human Pose Annotations, University of Pennsylvania, Apr. 16, 2017, pp. 1-10.

Alin-Ionut Popa, Deep Multitask Architecture for Integrated 2D and 3D Human Sensing, Department of Mathematics, Faculty of Engineering, Lund University, Jan. 31, 2017, pp. 1-10.

Haibo Qiu, Cross View Fusion for 3D Human Pose Estimation, University of Science and Technology of China, Sep. 3, 2019, pp. 1-10.

Edoardo Remelli, Lightweight Multi-View 3D Pose Estimation through Camera-Disentangled Representation, CVLab, EPFL, Lausanne, Switzerland, Jun. 20, 2020, pp. 1-16.

Xiao Sun, Integral Human Pose Regression, Microsoft Research, Beijing, China, Springer Nature Switzerland AG 2018, pp. 536-553.

Ilya Sutskever, Sequence to Sequence Learning with Neural Networks, Dec. 12, 2014, pp. 1-9.

Hanyue Tu, VoxelPose: Towards Multi-Camera 3D Human Pose Estimation in Wild Environment, University of Science and Technology of China, Aug. 24, 2020, pp. 1-17.

Ashish Vaswani, Attention Is All You Need, 31st Conference on Neural Information Processing Systems (NIPS 2017), Long Beach, CA, USA, pp. 1-15.

Yuqing Wang, End-to-End Video Instance Segmentation with Transformers, CVF, The University of Adelaide, Australia, 2021, pp. 8741-8750.

Felix Wu, Pay Less Attention With Lightweight and Dynamic Convolutions, Cornell University, Feb. 22, 2019, pp. 1-14.

Zhanghao Wu, Lite Transformer With Long-Short Range Attention, Massachusetts Institute of Technology, Apr. 24, 2020, pp. 1-13.

Bin Xiao, Simple Baselines for Human Pose Estimation and Tracking, Microsoft Research Asia, Beijing, China, Springer Nature Switzerland AG 2018, pp. 472-487.

Jianfeng Zhang, Inference Stage Optimization for Cross-scenario 3D Human Pose Estimation, National University of Singapore, Jul. 4, 2020, pp. 1-12.

(56) References Cited

OTHER PUBLICATIONS

Jianfeng Zhang, Body Meshes as Points, National University of Singapore, CVF, 2021, pp. 546-556.

Hengshuang Zhao, Exploring Self-attention for Image Recognition, CVF, 2021, pp. 10076-10085.

Xingyi Zhou, Towards 3D Human Pose Estimation in the Wild: a Weakly-supervised Approach, CVF, Shanghai Key Laboratory of Intelligent Information Processing School of Computer Science, Fudan University, pp. 398-407, 2017.

Xizhou Zhu, Deformable ConvNets v2: More Deformable, Better Results, University of Science and Technology of China, CVF, pp. 9308-9316, 2019.

Diederik P. Kingma, ADAM: a Method for Stochastic Optimization, University of Amsterdam, OpenAI, Jan. 30, 2017, pp. 1-15.

Adam Paszke, Automatic differentiation in PyTorch, 31st Conference on Neural Information Processing Systems (NIPS 2017), Long Beach, CA, USA, pp. 1-4.

Fu Xiong, Anchor-to-Joint Regression Network for 3D Articulated Pose Estimation from a Single Depth Image, Aug. 27, 2019.

Wu Liu, Recent Advances in Monocular 2D and 3D Human Pose Estimation: A Deep Learning Perspective, Apr. 23, 2021.

\* cited by examiner

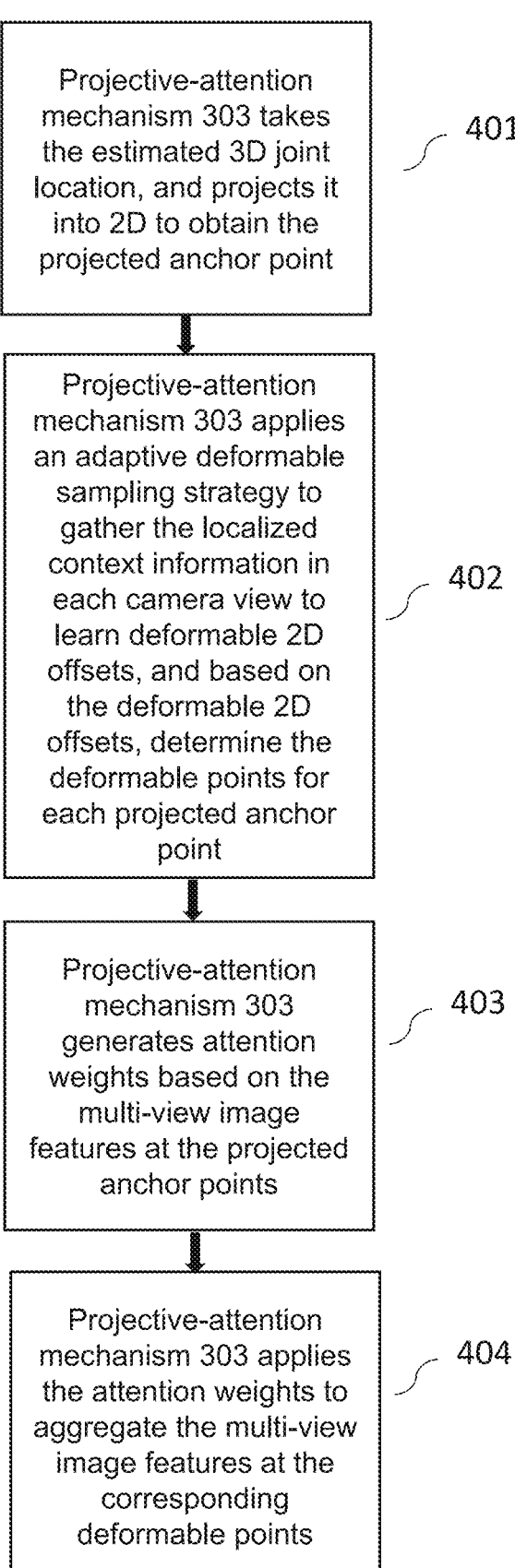

Projective-attention mechanism 303 takes the estimated 3D joint location, and projects it into 2D to obtain the projected anchor point — 401

Projective-attention mechanism 303 applies an adaptive deformable sampling strategy to gather the localized context information in each camera view to learn deformable 2D offsets, and based on the deformable 2D offsets, determine the deformable points for each projected anchor point — 402

Projective-attention mechanism 303 generates attention weights based on the multi-view image features at the projected anchor points — 403

Projective-attention mechanism 303 applies the attention weights to aggregate the multi-view image features at the corresponding deformable points — 404

FIGURE 4

Table 1: Result on the Panoptic dataset. MvP is more accurate and faster than VoxelPose.

| Methods | $AP_{25}$ | $AP_{50}$ | $AP_{100}$ | $AP_{150}$ | $Recall_{@500}$ | MPJPE[mm] | Time[ms] |
|---------|-----------|-----------|-----------|-----------|-----------------|-----------|----------|
| VoxelPose [35] | 84.0 | 96.4 | 97.5 | 97.8 | 98.1 | 17.8 | 320 |
| MvP (Ours) | 92.3 | 96.6 | 97.5 | 97.7 | 98.2 | 15.8 | 170 |

FIGURE 8

Table 2: Results (in PCP) on Shelf and Campus datasets.

| Methods | Shelf | | | | Campus | | | |
|---|---|---|---|---|---|---|---|---|
| | Actor 1 | Actor 2 | Actor 3 | Average | Actor 1 | Actor 2 | Actor 3 | Average |
| Belagiannis et al. [2] | 75.3 | 69.7 | 87.6 | 77.5 | 93.5 | 75.7 | 84.4 | 84.5 |
| Ershadi et al. [9] | 93.3 | 75.9 | 94.8 | 88.0 | 94.2 | 92.9 | 84.6 | 90.6 |
| Dong et al. [6] | 98.8 | 94.1 | 97.8 | 96.9 | 97.6 | 93.3 | 98.0 | 96.3 |
| VoxelPose [35] | 99.3 | 94.1 | 97.6 | 97.0 | 97.6 | 93.8 | 98.8 | 96.7 |
| MvP (Ours) | 99.3 | 95.1 | 97.8 | 97.4 | 98.2 | 94.1 | 97.4 | 96.6 |

FIGURE 10

Table 3

| RConv | AP$_{25}$ | AP$_{100}$ | MPJPE |
|---|---|---|---|
| w/ | 92.3 | 97.5 | 15.8 |
| w/o | 87.5 | 96.2 | 17.4 |

(a) The effect of *RayConv*. w/o means removing RayConv.

| Query | AP$_{25}$ | AP$_{100}$ | MPJPE |
|---|---|---|---|
| Per-joint | 67.4 | 84.7 | 41.2 |
| Hier. | 82.5 | 93.2 | 19.5 |
| Hier.+ad. | 92.3 | 97.5 | 15.8 |

(b) Different joint query embedding schemes.

| Thr. | AP$_{25}$ | AP$_{100}$ | MPJPE |
|---|---|---|---|
| 0.0 | 93.1 | 98.5 | 16.3 |
| 0.1 | 92.3 | 97.5 | 15.8 |
| 0.2 | 91.1 | 96.2 | 15.5 |
| 0.4 | 89.2 | 93.7 | 15.0 |

(c) Different confidence threshold during evaluation.

| Dec. | AP$_{25}$ | AP$_{100}$ | MPJPE |
|---|---|---|---|
| 2 | 6.3 | 92.5 | 49.6 |
| 3 | 63.4 | 95.6 | 22.8 |
| 4 | 86.8 | 96.8 | 17.5 |
| 5 | 91.8 | 97.6 | 16.2 |
| 6 | 92.3 | 97.5 | 15.8 |
| 7 | 92.0 | 97.5 | 15.9 |

(d) Number of decoder layers.

| Cam. | AP$_{25}$ | AP$_{100}$ | MPJPE |
|---|---|---|---|
| 1 | 4.7 | 61.0 | 93.8 |
| 2 | 37.7 | 93.0 | 34.8 |
| 3 | 71.8 | 95.1 | 21.1 |
| 4 | 84.1 | 96.7 | 19.3 |
| 5 | 92.3 | 97.5 | 15.8 |

(e) Number of camera views.

| K | AP$_{25}$ | AP$_{100}$ | MPJPE |
|---|---|---|---|
| 1 | 88.6 | 96.3 | 18.2 |
| 2 | 89.3 | 97.5 | 17.4 |
| 4 | 92.3 | 97.7 | 15.8 |
| 8 | 84.4 | 91.1 | 20.3 |

(f) Number of deformable points $K$.

FIGURE 11

Table 4 : Results of replacing camera ray directions with 2D coordinates in RayConv

| Positional Input | $AP_{25}$ | $AP_{100}$ | MPJPE |
|---|---|---|---|
| Camera Ray Directions | 92.3 | 97.5 | 15.8 |
| 2D Spatial Coordinates | 83.3 | 93.0 | 18.1 |

FIGURE 12

Table 5 :Comparison between Dense Attention and Projective Attention

| Models | $AP_{25}$ | $AP_{100}$ | MPJPE | GPU Memory[G] |
|---|---|---|---|---|
| MvP-Dense | 0.0 | 16.1 | 114.5 | 31.0 |
| MvP | 92.3 | 97.5 | 15.8 | 6.1 |

FIGURE 13

NEURAL NETWORK SYSTEM FOR 3D POSE ESTIMATION

FIELD OF THE INVENTION

The invention pertains to a neural network system for three-dimensional (3D) pose estimation, in particular, the 3D pose estimation of a plurality of persons.

BACKGROUND 3D pose estimation is the process of predicting the articulated pose of a human body from two-dimensional (2D) images. The input to the 3D pose estimation system can be single view (monocular) or multi-view. Multi-view refers to multi-view camera images, or 2D images from a plurality of multi-view cameras. Further, the 3D pose estimation is done for multiple people captured in the 2D images. Thus, the 3D pose estimation system aims to localize 3D skeleton joints for each person captured in a particular scene based on the multi-view camera images. For example, a scene can depict five people, and the scene is captured by three cameras. Based on the 2D images captured by the three cameras, 3D pose estimation will produce 3D poses for the five people. 3D pose estimation have many real-world applications that span applications in the realm of surveillance, sports casting, gaming and augmented reality.

One of the current 3D pose estimation techniques is reconstruction-based [6, 4, 13, 19] ([ ] denotes references). This technique first estimates 2D poses in each view independently. It then aggregates them using cross-view matching and reconstructs their 3D counterparts via triangulation or a 3D pictorial structure model. However, it is difficult to construct robust and efficient cross-view correspondence with the noisy and incomplete 2D poses of individual views. Further, this technique is also constrained as the accuracy of the 3D prediction depends heavily on the 2D prediction and can omit vital appearance information. Further, cross-view matching is computationally expensive and this grows linearly with more people and is thus not scalable for scenes that depict more people in them.

Another of the current 3D pose estimation techniques uses a two stage detection-alike framework with volumetric representation [35]. This technique firsts obtains the 2D heat-map estimation of each individual camera view, then constructs a unified 3D joint confidence volume to estimate 3D human proposals, and finally regresses the 3D per-joint position with finer volume. Though this technique does alleviate the aforementioned cross-view matching issue, the 3D volumetric representation can be costly, especially in large and sparse scenes. Furthermore, since the model operates in an inefficient two-stage method, the cost of the second-stage per-person joint estimation will scale in relation to the number of people in the scene.

Thus, what is required is a novel solution which is capable of predicting 3D poses for a plurality of people in a scene from multi-view images in a more efficient and accurate manner. Furthermore, other desirable features and characteristics will become apparent from the subsequent detailed description and the appended claims, taken in conjunction with the accompanying drawings and this background of the disclosure.

SUMMARY OF INVENTION

According to a first aspect of the invention, a system is described, the system comprising one or more computers and one or more storage devices storing instructions that, when executed by the one or more computers, cause the one or more computers to implement a neural network system for predicting 3D poses of a plurality of persons in a scene based on 2D input images, each of the 2D input images obtained from a different camera view, the different camera views capturing a visual of the plurality of persons in a scene from different perspectives.

The neural network system comprising an encoder neural network and a decoder neural network, the encoder neural network configured to extract multi-view image features from the 2D input images, the decoder neural network configured to receive the multi-view image features as input, and predict 3D joint locations of each of the plurality of persons. Wherein the decoder neural network comprises decoder layers to regressively refine the predicted 3D joint locations, and wherein each of the decoder layers comprises a projective-attention mechanism.

The projective-attention mechanism is configured to: determine a 2D projection of a predicted 3D joint location for each of the different camera views, wherein the predicted 3D joint location is obtained from a preceding decoder layer or is determined by linear methods based on input joint queries; assign the 2D projection as an anchor point for each of the different camera views; apply an adaptive deformable sampling strategy to gather localized context information of the different camera views to learn deformable offsets, and based on the deformable offsets, determine the deformable points for each of the anchor points; generate attention weights based on the multi-view image features at the anchor points; and apply the attention weights to aggregate the multi-view image features at the deformable points.

Preferably, the input joint queries are joint query embeddings, the joint query embeddings comprising hierarchical embedding of joint queries and person queries that encode a person-joint relation; and wherein each of the decoder layers further comprises a self-attention mechanism configured to perform self-attention on the joint query embeddings.

Preferably, the joint query embeddings are augmented with scene level information that are specific to each of the 2D input images.

Preferably, the system further comprises a positional encoder, the positional encoder configured to encode the camera ray directions for each of the different camera views into the multi-view image features.

Preferably, the camera ray directions are generated with camera parameters of the different camera views; and wherein encoding the camera ray directions for each of the different camera views into the multi-view image features comprises concatenating channel-wisely the camera ray directions to the corresponding image features, and applying a standard convolution to obtain updated image representations.

Preferably, the projective-attention mechanism is further configured to: receive the updated image representations as input; generate attention weights based on the updated image representations at the anchor points; and apply the attention weights to aggregate the updated image representations at the deformable points.

Preferably, each of the decoder layers further comprises a feed forward network block, the feed forward network block configured to apply feed-forward regression to predict the 3D joint locations, and confidence scores of the predicted 3D joint locations.

Preferably, the decoder neural network comprises at least four decoder layers.

Preferably, the encoder neural network comprises a convolutional neural network or a transformer based component.

According to a second aspect of the invention, a method for predicting 3D poses of a plurality of persons in a scene based on 2D input images is described, each of the 2D input images obtained from a different camera view, the different camera views capturing a visual of the plurality of persons in a scene from different perspectives, the method comprising the steps of extracting multi-view image features from the 2D input images using an encoder neural network; and receiving as input at a decoder neural network, the multi-view image features, the decoder neural network comprising decoder layers, each of the decoder layers comprising a projective-attention mechanism.

The method further comprise the steps of determining with the projective-attention mechanism, a 2D projection of a predicted 3D joint location for each of the different camera views, wherein the predicted 3D joint location is obtained from a preceding decoder layer or is determined by linear methods based on input joint queries; and assigning with the projective-attention mechanism, the 2D projection as an anchor point for each of the different camera views.

The method further comprises the steps of applying with the projective-attention mechanism, an adaptive deformable sampling strategy to gather localized context information of the different camera views to learn deformable offsets, and based on the deformable offsets, determining the deformable points for each of the anchor points; generating with the projective-attention mechanism, attention weights based on the multi-view image features at the anchor points; applying with the projective-attention mechanism, the attention weights to aggregate the multi-view image features at the deformable points; and applying the decoder layers to regressively refine the predicted 3D joint locations to obtain the 3D poses for each of the plurality of persons.

Preferably, the input joint queries are joint query embeddings, the joint query embeddings comprising hierarchical embedding of joint queries and person queries that encode a person-joint relation; and wherein each of the decoder layers further comprises a self-attention mechanism; and wherein the method further comprises the step of performing self-attention on the joint query embeddings with the self-attention mechanism.

Preferably, the method further comprises the step of augmenting the joint query embeddings with scene level information that are specific to each of the 2D input images.

Preferably, the method further comprises the step of using a positional encoder to encode the camera ray directions for each of the different camera views into the multi-view image features.

Preferably, the step of using a positional encoder to encode the camera ray directions for each of the different camera views into the multi-view image features comprises the steps of:—generating camera ray directions with camera parameters of the different camera views; concatenating channel-wisely the camera ray directions to the corresponding image features; and applying a standard convolution to obtain updated image representations.

Preferably, the method further comprises the steps of receiving with the projective-attention mechanism, the updated image representations as input; generating with the projective-attention mechanism, attention weights based on the updated image representations at the anchor points; and applying with the projective-attention mechanism, the attention weights to aggregate the updated image representations at the deformable points.

Preferably, each of the decoder layers further comprises a feed forward network block, and wherein the method further comprises the step of applying with the feed forward network block, feed-forward regression to predict the 3D joint locations and confidence scores of the predicted 3D joint locations.

Preferably, the decoder neural network comprises at least four decoder layers.

Preferably, the encoder neural network comprises a convolutional neural network or a transformer based component.

According to a third aspect of the invention, a non-transitory computer storage medium is described, the non-transitory computer storage medium encoded with instructions that, when executed by one or more computers, cause the one or more computers to implement a neural network system for predicting 3D poses of a plurality of persons in a scene based on 2D input images, each of the 2D input images obtained from a different camera view, the different camera views capturing a visual of the plurality of persons in a scene from different perspectives.

The neural network system comprising an encoder neural network and a decoder neural network, the encoder neural network configured to extract multi-view image features from the 2D input images, the decoder neural network configured to receive the multi-view image features as input, and predict 3D joint locations of each of the plurality of persons; wherein the decoder neural network comprises decoder layers to regressively refine the predicted 3D joint locations, and wherein each of the decoder layers comprises a projective-attention mechanism.

The projective-attention mechanism configured to: determine a 2D projection of a predicted 3D joint location for each of the different camera views, wherein the predicted 3D joint location is obtained from a preceding decoder layer or is determined by linear methods based on input joint queries; assign the 2D projection as an anchor point for each of the different camera views; apply an adaptive deformable sampling strategy to gather localized context information of the different camera views to learn deformable offsets, and based on the deformable offsets, determine the deformable points for each of the anchor points; generate attention weights based on the multi-view image features at the anchor points; and apply the attention weights to aggregate the multi-view image features at the deformable points.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

FIG. 4 shows the steps performed by the projective-attention mechanism, in accordance with certain embodiments.

FIG. 8 shows Table 1 which depicts the results of the MvP model being evaluated with the Panoptic dataset and compared with the VoxelPose model.

FIG. 10 shows Table 2 which depicts the results of the MvP model being evaluated with the Shelf and Campus dataset and compared with other models.

FIG. 11 shows Table 3 (a) which depicts the results of the MvP model with and without RayConv, Table 3(b) which depicts the results of the MvP model with using different joint query embedding schemes, Table 3(c) which depicts the results of the MvP model using different confidence thresholds, Table 3(d) which depicts the results of the MvP model using different number of decoder layers, Table 3(e) which depicts the results of the MvP model using different number of camera views, and Table 3(f) which depicts the results of the MvP model using different number of deformable points.

FIG. 12 shows Table 4 which depicts the results of replacing camera ray directions with 2D coordinates in RayConv.

FIG. 13 shows Table 5 which depicts the comparison between Dense Attention and Projective Attention.

Figure 1:
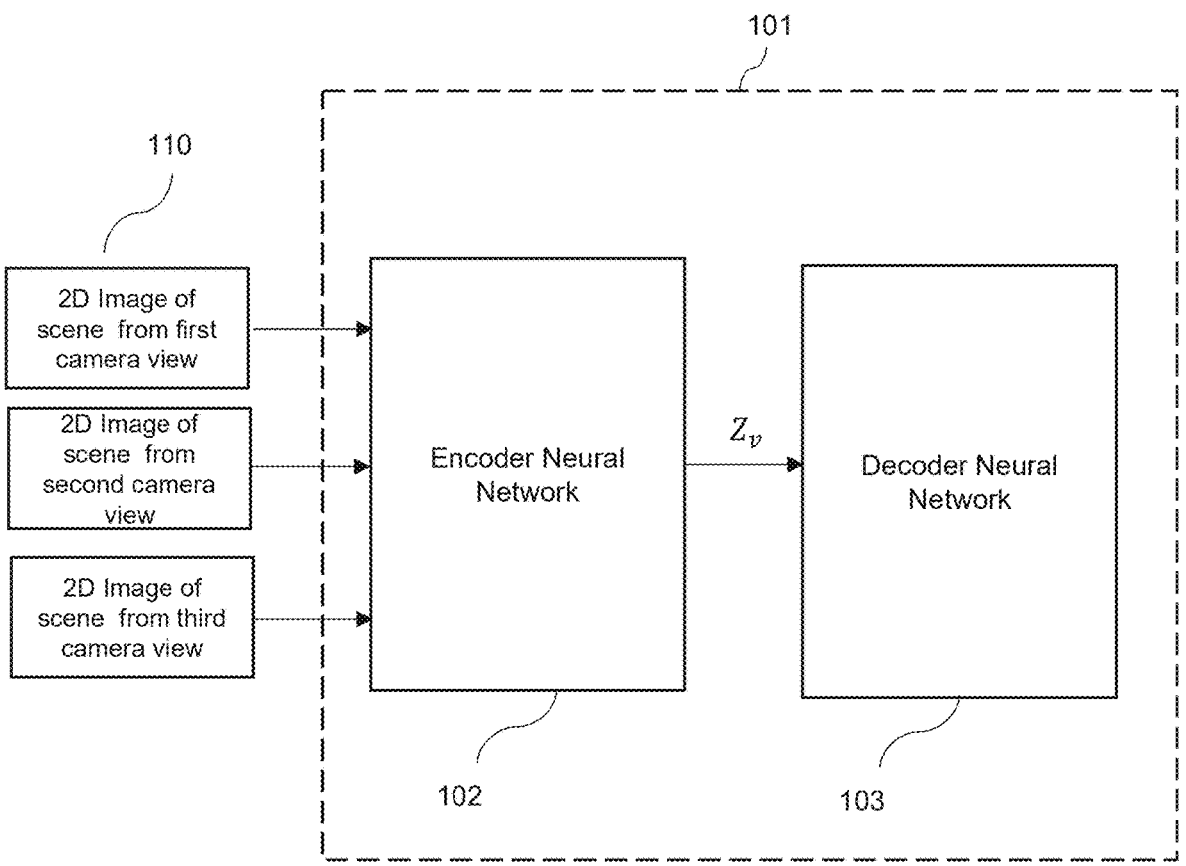
FIG. 1 shows a neural network system for estimating or predicting 3D poses of a group of people in a scene based on 2D input images, in accordance with certain embodiments.

Skilled artisans will appreciate that elements in the figures are illustrated for simplicity and clarity and have not necessarily been depicted to scale. For example, the dimensions of some of the elements in the block diagrams or steps in the flowcharts may be exaggerated in respect to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a neural network system for estimating or predicting 3D poses of a group of people in a scene based on 2D input images. Each of the 2D input images can be obtained from a different camera view, the different camera views capturing a visual of the group of people in the scene from different perspectives/angles.

The neural network system can comprise an encoder neural network and a decoder neural network. The encoder neural network can be configured to extract multi-view image features from the 2D input images. The decoder neural network can be configured to receive the multi-view image features as input, and predict 3D joint locations of each person to predict the 3D poses. The decoder neural network can comprise decoder layers to regressively refine the predicted 3D joint locations. The decoder layers can comprise a projective-attention mechanism. The projective-attention mechanism can be configured to receive the multi-view image features as input.

The projective-attention mechanism can also be configured to determine a 2D projection of a predicted 3D joint location for each of the different camera views. The predicted 3D joint location can be obtained from a preceding decoder layer or can be determined by linear methods based on input joint queries. The projective-attention mechanism can also be configured to apply an adaptive deformable sampling strategy to gather localized context information of the different camera views to learn deformable offsets, and based on the deformable offsets, determine the deformable points for each of the anchor points. The projective-attention mechanism can also be configured to generate attention weights based on the multi-view image features at the anchor points. The projective-attention mechanism can also be configured to apply the attention weights to aggregate the multi-view image features at the deformable points.

Thus, only the multi-view image features which are near the anchor point and are contextually relevant to the joint (i.e. the multi-view image features at the deformable points which are corresponding to the anchor point) are fused and aggregated, while the multi-view image features which are far away from the anchor point and are not contextually relevant to joint, are advantageously ignored in the computation. The projective-attention mechanism therefore capitalises on geometric knowledge and can reduce computational costs. Hence, projective-attention mechanism is much more efficient and delivers better performance than if a regular attention mechanism was used.

In embodiments, the input joint queries are joint query embeddings, the joint query embeddings comprising the hierarchical embedding of joint queries and person queries that encode a person-joint relation. Thus the joint-level information can be shared across the group of people. This method of sharing joint embedding across different persons and use of person level query embedding help the model in learning both person-level and joint-level priors. Further, encoding the person-joint relation allows for better generalizations to different scenes, and allow the model to more accurately localize the 3D joint locations. Furthermore, the number of queries are reduced when compared to the brute force method of assigning a learnable query vector to each joint for every person in the scene. In embodiments, the decoder layers of decoder neural network can comprise a self-attention mechanism configured to perform self-attention on the joint query embeddings.

However, as there are plurality of 2D input images, each from different camera views, the joint query embeddings may not generalize well because the learned joint query embeddings will be shared for all the 2D input images, even when the 2D input images convey different visual information. To remedy this, in embodiments, the joint query embeddings can be augmented with scene level information that are specific to each of the 2D input images. This augmentation can be done both during model training and development such that the learnt joint queries can be adaptive to the plurality of input images.

In embodiments, the neural network system can further comprise a positional encoder. The positional encoder can be configured to obtain the camera ray directions for each of the different camera views, and encode the camera ray directions into the multi-view image features. Specifically, the camera ray direction of each camera view is generated with camera parameters of the camera view. The camera ray directions are then concatenated channel-wisely to the corresponding image features. Then, a standard convolution is applied to obtain updated image representations. The updated image representations can then be provided to the projective-attention mechanism of the decoder neural network as input and the projective-attention mechanism can use the updated image representations in place of the multi-view image features.

Positional encoding is an important component of the transformer, which provides positional information of the input sequence. However, a simple per-view 2D positional encoding scheme cannot encode the geometrical information of the different camera views. To remedy this, and as mentioned in the preceding paragraph, the camera ray directions that represent positional information in 3D space are advantageously encoded into the multi-view image features. Computationally, encoding the camera ray directions into the multi-view image features incur negligible additional costs. However, this operation injects strong multi-view geometrical information to augment the projective attention scheme, thus helping more precisely predict the refined 3D joint location.

In embodiments, the decoder layers of decoder neural network can comprise Feed-Forward Network block. The Feed-Forward Network block can be configured to apply feed-forward regression to predict the 3D joint locations, and the confidence scores of the predicted 3D joint locations.

FIG. 1 shows neural network system 101 for estimating or predicting 3D poses of a group of people in a scene based on 2D input images 110, in accordance with certain embodiments. 2D input images 110 can be obtained from different camera views. The different camera views can capture visuals of the group of people in a scene from different perspectives or angles. For example, 2D input images 110 can be obtained from a first camera view, a second camera view and a third camera view.

Neural network system 101 can comprise encoder neural network 102 and decoder neural network 103. Encoder neural network 102 can be configured to extract multi-view image features $Z_v$ from 2D input images 110, where $Z_v$ denotes the image feature from the v-th camera view and V is the total number of camera views. Feature extraction, as known in the art in image processing, is a part of the dimensionality reduction process, in which, an initial set of the raw data is divided and reduced to more manageable groups, thus, effectively reducing the amount of data. These features are easy to process, but still able to describe the actual data set with the accuracy and originality. Encoder neural network 102 can utilize any feature extraction technique known in the art to extract multi-view image features $Z_v$ from 2D input images 110.

In embodiments, encoder neural network 102 can be a Convolutional Neural Network (CNN). In embodiments, encoder neural network 102 can be a transformer based component instead of a CNN. In embodiments, encoder neural network 102 is configured to provide multi-view image features $Z_v$ to decoder neural network 103 as depicted in FIG. 1. Decoder neural network 103 is configured to receive multi-view image features $Z_v$ and regressively predict 3D joint locations of each person in the scene.

Figure 2:
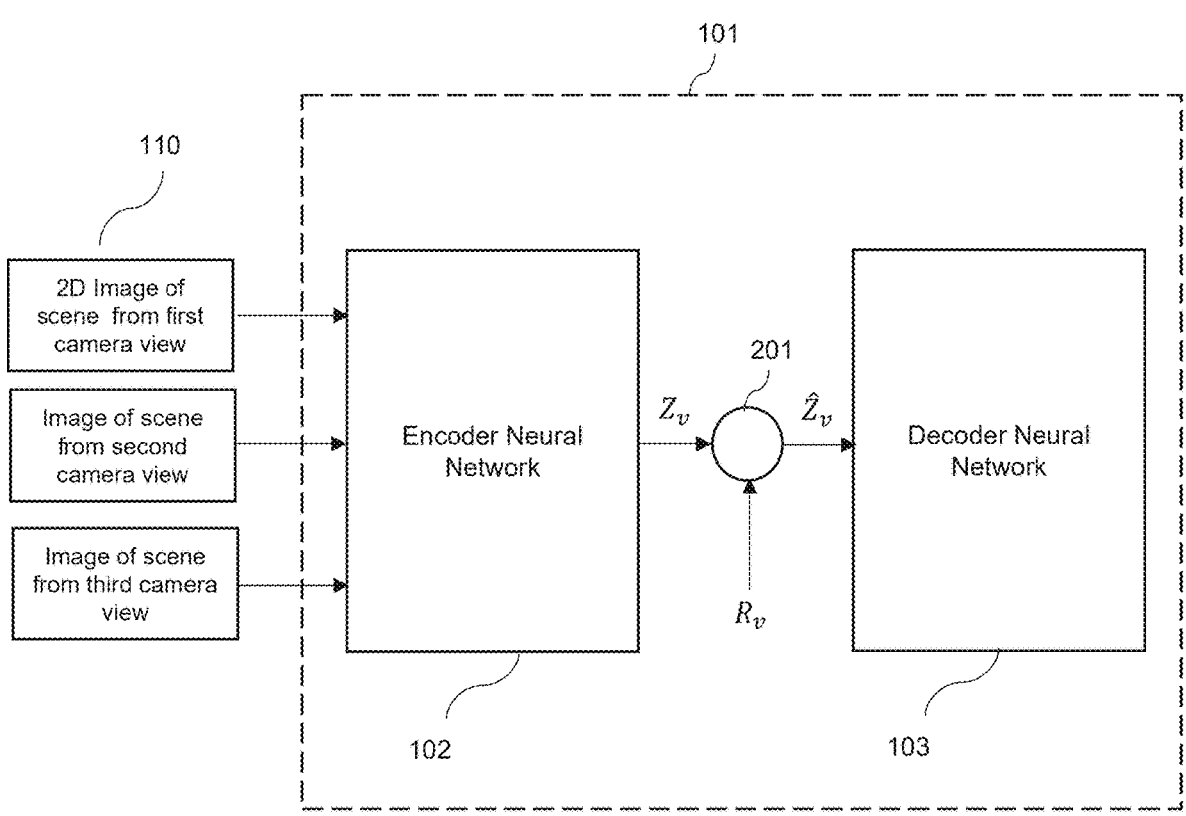
FIG. 2 shows a neural network system for estimating or predicting 3D poses of a group of people in a scene based on 2D input images, comprising a positional encoder for encoding camera ray directions into the multi-view image features, in accordance with certain embodiments.

Positional encoding is an important component of the transformer, which provides positional information of the input sequence. However, a simple per-view 2D positional encoding scheme cannot encode the geometrical information of the different camera views. To remedy this, neural network system 101 can in embodiments further comprise positional encoder 201 as shown in FIG. 2. Positional encoder 201 can be configured to obtain camera ray directions $R_v$ for each of the different camera views (for example, from the three different cameras in FIG. 2), and encode camera ray directions $R_v$ into the multi-view image features $Z_v$.

Specifically, camera ray direction $R_v$ of each different camera view is generated with camera parameters of the camera view. The camera ray directions are then concatenated channel-wisely to the corresponding image features $Z_v$. A standard convolution is then applied to the concatenated corresponding image features $Z_v$ and camera ray directions $R_v$ to obtain updated feature representations $\hat{Z}_v$:

$$\hat{Z}_v = Conv(Concat(Z_v, R_v)) \qquad (1)$$

As shown in FIG. 2, updated image representations $\hat{Z}_v$ can be provided to decoder neural network 103 as input in place of multi-view image features $Z_v$.

Thus, camera ray directions $R_v$ that represent positional information in 3D space are advantageously encoded into the multi-view image features $Z_v$. Computationally, encoding the camera ray directions $R_v$ into the multi-view image features $Z_v$ incur negligible additional costs. However, this operation injects strong multi-view geometrical information into decoder neural network 103, thus helping more precisely predict the 3D joint locations.

Decoder neural network 103 can be configured to receive multi-view image features $Z_v$ or updated image representations $Z_v$ as input, and predict 3D joint locations of each person in the scene to estimate their 3D poses. Decoder neural network 103 can comprise a plurality of decoder layers. The plurality of decoder layers can regressively refine the predicted 3D joint locations.

Figure 3:
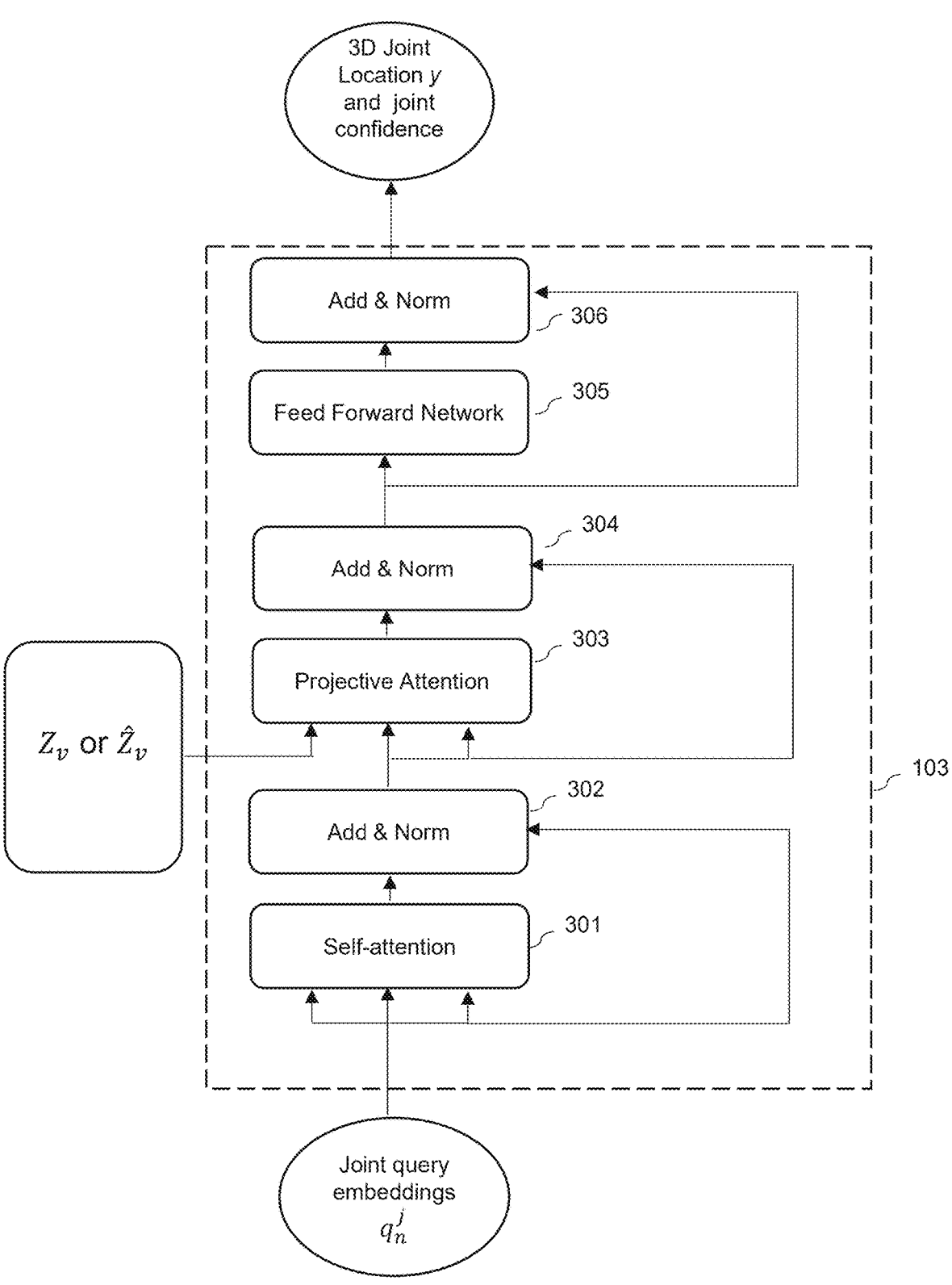
FIG. 3 shows a decoder layer of a decoder neural network, in accordance with certain embodiments.

FIG. 3 shows a decoder layer of decoder neural network 103, in accordance with certain embodiments. The decoder layers of decoder neural network 103 can comprise self-attention mechanism 301. Self-attention mechanism 301 can be configured to accept joint query embeddings as input.

The most straightforward way for designing joint query embeddings is to maintain a learnable query vector for each joint per person. However, this scheme does not work well, because such a naive strategy does not allow joint level knowledge to be shared among different people.

To tackle this problem, in embodiments, a hierarchical query embedding scheme is used to hierarchically embed the joint queries and the person queries together, to explicitly encode the person-joint relation persons. In other words, each person-level query is added individually to the same set of joint-level queries to obtain the per-person customized joint queries. This hierarchical embedding offers joint-level information sharing across different persons and reduces the learnable parameters, helping the model to learn useful knowledge from the training data, and thus generalize better.

Concretely, instead of using a set of independent queries $\{q_m\}_{m=1}^{M} \subset R^C$, which would be the most straightforward way, a set of person-level queries $\{h_n\}_{n=1} \subset R^C$ and a set of joint level queries $\{l_j\}_{j=1}^{J} \subset R^C$ are employed to represent different persons and different joints, where (denotes the feature dimension, Nis the number of people in the scene, J is the number of joints of a person, and M=NJ.

Then, the query of joint j of person n can be hierarchically formulated as:

$$q_n^j = h_n + I_j \qquad (2)$$

As shown in FIG. 3, self-attention mechanism 301 can be configured to accept joint query embeddings $q_n^j$ as input.

This hierarchical embedding scheme as described is advantageous as the joint embeddings can be shared across different persons and the use of person level query embedding help the model in learning both person-level and joint-level priors. Further, encoding the person-joint relation allows for better generalizations to different scenes, and allow the model to more accurately localize the 3D joint locations. Furthermore, the number of queries can be reduced when compared to the brute force method of assigning a learnable query vector to each joint for every person in the scene. For example, with such a hierarchical embedding scheme, the number of learnable query embedding parameters can be reduced from NJC to (N+J)C.

However, as there are plurality of 2D input images 110, each from different camera views, the hierarchical query embedding may not generalize well because the learned joint query embeddings $q_n^j$ will be shared for all 2D input images 110, even when the 2D input images 110 convey different visual information. To address this, in embodiments, the joint level queries can be augmented with scene level information that are specific to each of the 2D input images 110. This augmentation can be done both during model training and development such that the learned joint query embeddings $q_n^j$ can be adaptive to 2D input images 110 and generalize better.

Concretely, the joint query embeddings $q_n^j$ are augmented with a globally pooled feature vector $g \in R^C$ from the multi-view image features.

$g = Concat(Pool(Z_1), \ldots, Pool(Z_v))W^9$, and Concat denotes concatenation and Pool denotes pooling operations and $W^9$ is a learnable weight.

The augmented joint query embeddings $q_n^j$ can be formulated as:

$$q_n^j = g + h_n + I_j \qquad (3)$$

Self-attention mechanism 301 can be configured to accept augmented joint query embeddings $q_n^j$ as input. In embodiments, self-attention mechanism 301 can be configured to perform self-attention as known in the art on joint query embeddings $q_n^j$. The result of conducting this self-attention is that pair-wise interaction is performed between all the joints j from all the persons n in the scene.

In embodiments, the decoder layers of decoder neural network 103 can comprise Add & Norm block 302. Add & Norm block 302 is configured to apply normalization with residual connection to the output of self-attention mechanism 301.

In embodiments, the decoder layers of decoder neural network 103 can comprise projective-attention mechanism 303. Multi-view image features $Z_v$ or updated image representations $\hat{Z}_v$ can be fed directly as input into projective-attention mechanism 303 as shown in FIG. 3.

It is important to aggregate complementary multi-view image features $Z_v$ so as to transform the joint query embeddings $q_n^j$ into accurate 3D joint locations. Traditional attention mechanisms [36] can be used to fuse multi-view image features $Z_v$. However, simply using such attention mechanisms will be computationally prohibitive as they will densely aggregate the multi-view image features. Projective-attention mechanism 303 as described herein does not suffer from these shortcomings as it is a novel attention mechanism that is geometrically guided to fuse the multi-view image features $Z_v$. The steps performed by projective-attention mechanism 303 are illustrated in FIG. 4.

Figure 5:
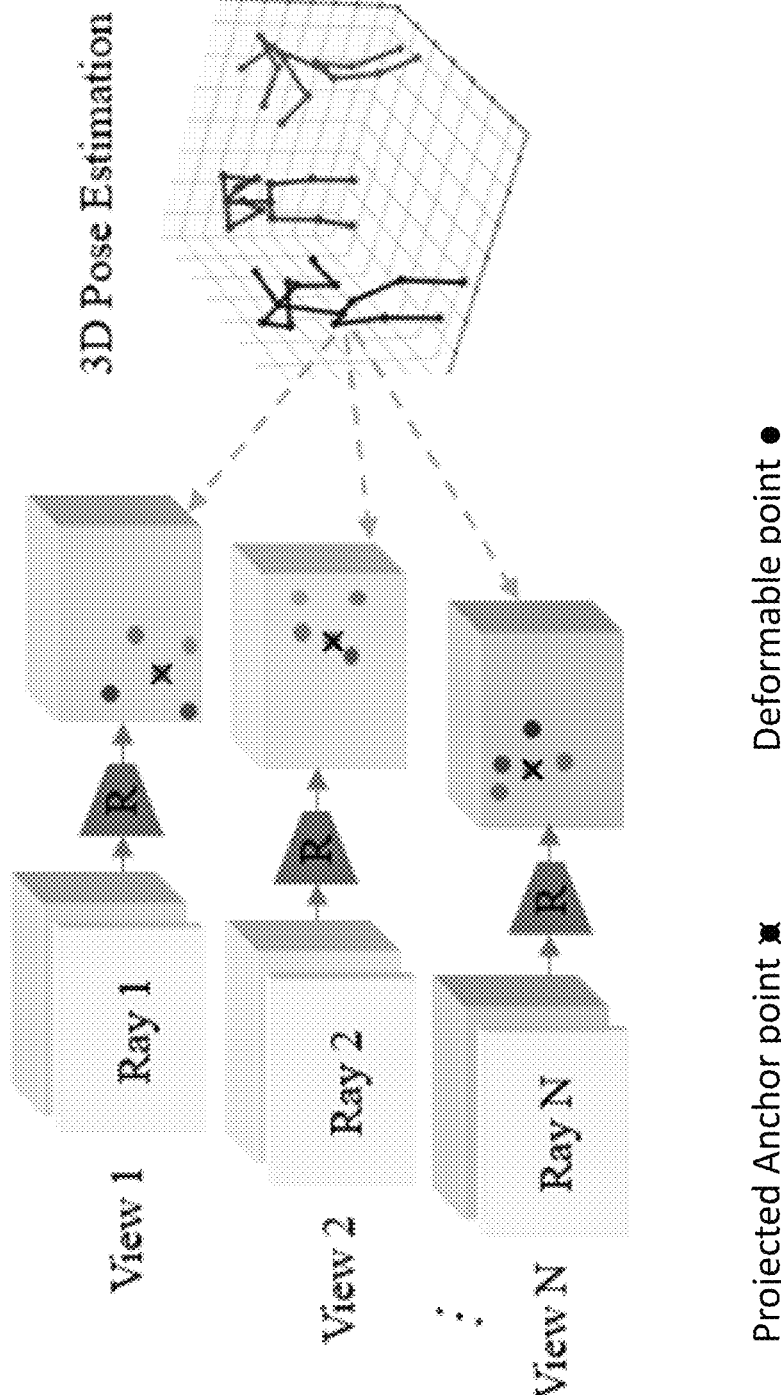
FIG. 5 shows the projection of the estimated 3D joint location into 2D to obtain the anchor points for each camera view, and the determined deformable points of the anchor points, in accordance with certain embodiments.

In step 401, projective-attention mechanism 303 takes the estimated 3D joint location, and projects it into 2D to obtain the projected anchor point. This process is repeated for each different camera view such that a projected anchor point is obtained for each different camera view. This "projection" of the estimated 3D joint location to 2D to obtain the projected anchor point for each different camera view is illustrated in FIG. 5.

To initialize the model, the first decoder layer of decoder neural network 103 can use linear methods to determine the "initial" estimated 3D joint location based on the input joint queries (e.g. joint query embeddings $q_n^j$). This "initial" estimated 3D joint location can then be utilized by the projective-attention mechanism 303 of the first decoder layer to determine the projected anchor points as per step 401, and then update the current prediction by aggregating the multi-view image features $Z_v$. The projective-attention mechanism 303 in the second decoder layer can then use the estimated 3D joint location that is predicted by the first decoder layer to determine the projected anchor points as per step 401. Thus, subsequent decoder layers can use the estimated 3D joint location as predicted by the preceding decoder layer for the "projection", and thus regressively refine the predicted joint location.

In step 402, projective-attention mechanism 303 applies an adaptive deformable sampling strategy to gather the localized context information in each camera view. Specifically, motivated by deformable convolutions [5, 45], the deformable 2D offsets are learned, and based on the deformable 2D offsets, the deformable points for each projected anchor point are determined. The projected anchor points of each different camera view, and their corresponding deformable points are shown in FIG. 5.

Furthermore, adaptive local context information is gathered with the deformable sampling operation. For instance, when regressing the 3D joint location of a mid-hip joint, the projective attention selectively attends to informative joints such as the left hip joint, and the right hip joint as well as the thorax, which offers sufficient contextual information for accurate estimation. In other words, information about other "relevant" joints can provide useful context information to help predict or determine the joint's 3D location.

Figure 6:
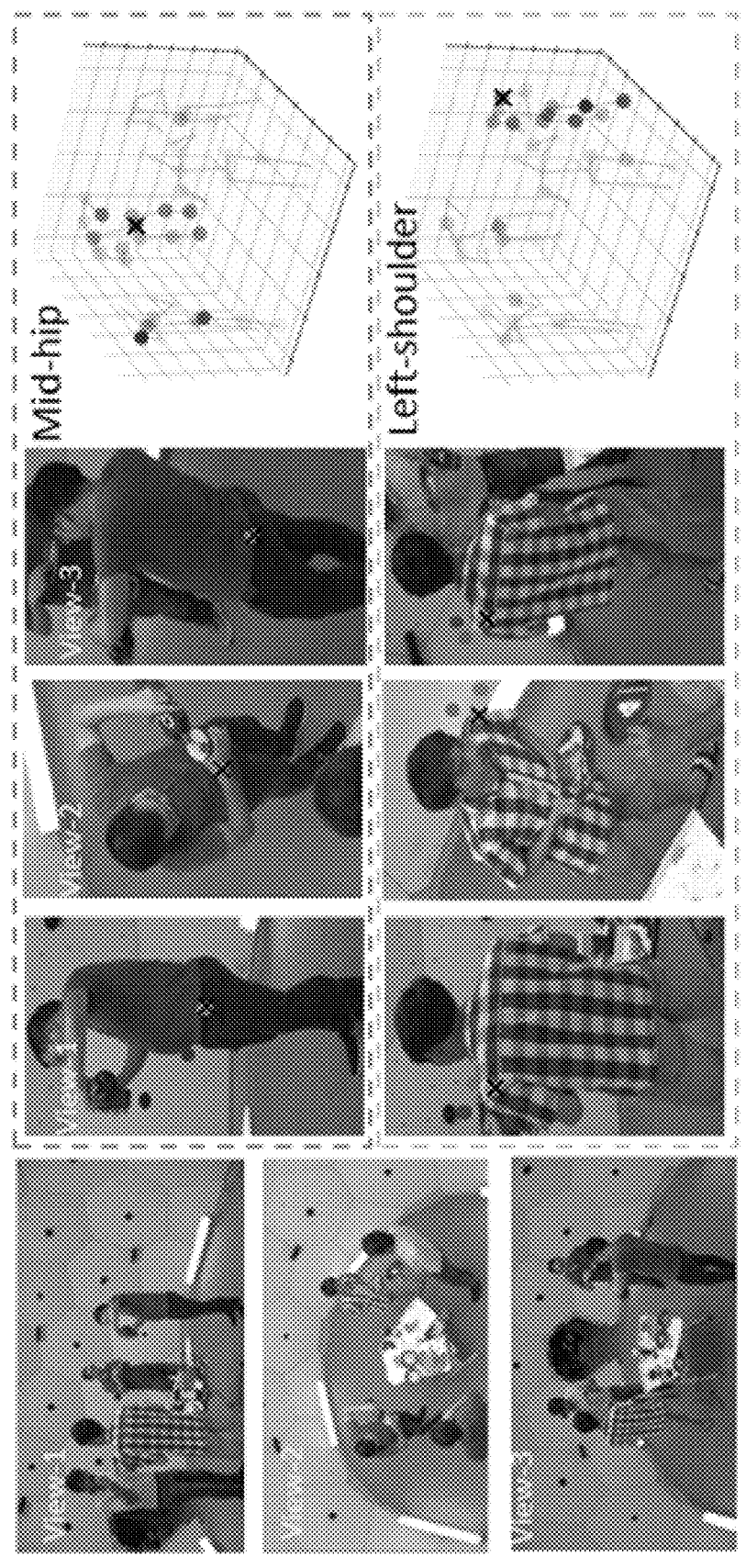
FIG. 6 shows the visualization of projective-attention on example skeleton joints, in accordance with certain embodiments.
Figure 7:
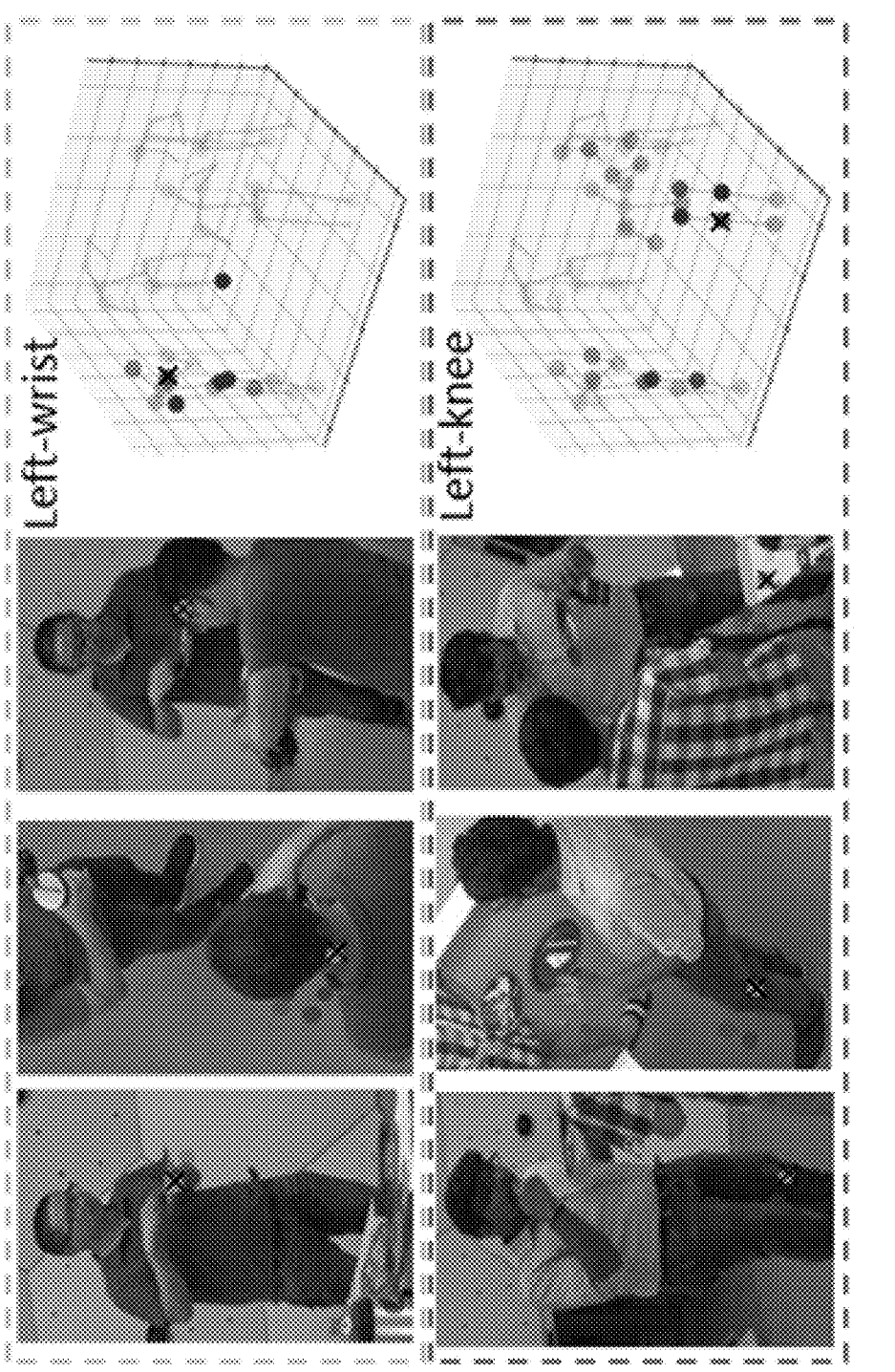
FIG. 7 shows the visualization of projective-attention on example skeleton joints, in accordance with certain embodiments.

FIGS. 6 and 7 show the determination of the projected anchor points and deformable points for specific joints. The deformable points having darker shading indicates stronger attention. Therefore, it can be seen that a certain joint mainly attends to other joints of the same person instance (more opaque). It also attends to joints from other person instances, but with less attention (more transparent). This phenomenon is reasonable as the skeleton joints of a human body are strongly correlated to each other, e.g., with certain pose priors and bone length. In other words, "relevant" joints are given more attention while less "relevant" joints are given less attention.

In step 403, projective-attention mechanism 303 generates attention weights based on the multi-view image features at the projected anchor points.

In step 404, projective-attention mechanism 303 applies the attention weights to aggregate the multi-view image features at the corresponding deformable points of the projected anchor points.

Therefore, given joint query feature q and estimated 3D joint location y, the projection attention performed by projective-attention mechanism 303 can be illustrated as:

$$PAttention(q, y\{Z_v\}_{v=1}^V) = Concat(f_1, f_2, \ldots, f_v)W^P, \quad (4)$$

$$f_v = \sum_{k=1}^K a(k) \cdot Z_v(\Pi(y, C_v) + \Delta p(k))W^f$$

Here, the camera view-specific feature $f_v$ is obtained by aggregating features from K discrete offsetted sampling points from anchor point $p=\Pi(y, C_v)$. Anchor point p is located by projecting the current 3D joint location y to 2D, where $\Pi: R^3 \rightarrow R^2$ denotes perspective projection [10] and $C_v$ denotes the corresponding camera parameters. $W^P$ and $W^f$ are learnable linear weights.

The attention weight a and the offset to the projected anchor point $\Delta p$ are estimated from the fused query feature q and the camera-view dependent feature at the projected anchor point $Z_v(p)$, i.e., $a=Softmax((q+Z_v(p))W^a)$ and $\Delta p=(q+Z_v(p))W^p)$ where $W^a$ and $W^p$ are learnable linear weights. In embodiments, if the projected anchor point and the offset are fractional, bilinear interpolation is used to obtain the corresponding feature $Z_v(p)$ or $Z_v(p+\Delta p(t))$.

In essence, the projective attention performed by projective-attention mechanism 303 incorporates two geometrical cues i.e. the corresponding 2D spatial locations across views from the 3D to 2D joint projection and the deformed neighbourhood of the anchor points from the learned offsets to gather view-adaptive contextual information. Unlike a typical attention mechanism where the query feature naively and densely interacts with the multi-view image features across all the spatial locations, the projective attention as described is more selective for the interaction between the joint query embeddings and each camera view.

Specifically, only the multi-view image features $Z_v$ which are near the anchor point p and are contextually relevant to the joint are fused and aggregated, while the multi-view image features $Z_v$ which are far away from the anchor point p and are not contextually relevant to the joint are advantageously ignored in the computation. For example, information of a neck joint would most likely not provide any useful contextual information in the 3D joint prediction determination of a knee joint and can be advantageously ignored in the computation. Projective-attention therefore capitalises on geometric knowledge and can reduce computational costs. Hence, projective-attention mechanism 303 is much more efficient and delivers better performance than if a regular attention mechanism was used.

The output of projective-attention mechanism 303 is the gathered complementary multi-view information. In embodiments, the decoder layers of decoder neural network 103 can comprise Add & Norm block 304. Add & Norm block 304 is configured to apply normalization with residual connection to the output of projective-attention mechanism 303.

In embodiments, the decoder layers can comprise Feed-Forward Network (FFN) block 305. FFN block 305 can apply feed-forward regression to predict the 3D joint locations and their confidence scores.

In embodiments, the decoder layers can comprise Add & Norm block 306. Add & Norm block 306 is configured to apply normalization with residual connection to the output of FFN block 305.

The decoder layers are systematically applied to regressively refine the predicted 3D joint locations and obtain the 3D poses of each of the person in the scene. The decoder layers of decoder neural network 103 therefore implement a multi-layer progressive regressions scheme—each decoder layer outputs 3D joint offsets to regressively refine the 3D joint position from the previous layer. For example, the attention weights used in equation (4) are usually determined at the 4-th (fourth) decoder layer of a trained model. Therefore, in embodiments, decoder neural network 103 can comprise at least four decoder layers.

Neural network system 101 as described is therefore capable of directly and efficiently solving the challenging multi-view multi-person 3D human pose estimation problem. Different from existing methods relying on tedious intermediate tasks, neural network system 101 substantially simplifies the pipeline into a direct regression one by carefully designing the transformer-alike model architecture with a novel hierarchal joint query embedding scheme and projective-attention mechanism 303. Thanks to its efficiency, neural network system 101 would be scalable to handle very crowded scenes with many people. Moreover, the framework of neural network system 101 is general and thus extensible to other 3D modeling tasks like dense mesh recovery of common objects.

The neural network system 101 as described can have many applications and can be applied to various fields. For example, embodiments of the invention can be applied to augmented reality (AR), virtual reality (VR), digital entertainment, social media, image/video editing and generation, video surveillance, sports video analysis and animation. As described above, embodiments of the invention will save time and computation cost for obtaining more accurate 3D human poses from multiple cameras. Costs for game avatar design can be saved. Further, costs for generating the clothing model pictures for clothes display in a digital or online retail ecommerce platform can be saved.

Further, even though the above described embodiments are directed to predicting the 3D joint locations and poses of humans, one skilled in the art will understand that the invention can also be applied to predicting the 3D shape and configuration of other objects as well.

Extending to Body Mesh Recovery: Neural network system 101 learns skeleton joints feature representations and is extendable to recovering human mesh with a parametric body mesh model [24]. Specifically, after average pooling on the joint features into per-person feature, a feed-forward network is used to predict the corresponding body mesh represented by the parametric SMPL model [24]. Similar to the joint location prediction, the SMPL parameters follow multi-layer progressive regression scheme.

Training: As mentioned, neural network system 101 infers a fixed set of M joint locations for N different persons, where M=NJ. The main training challenge is how to associate the skeleton joints correctly for different person instances. Unlike the post-hoc grouping of detected skeleton joints as in bottom up pose estimation methods [28, 21], neural network system 101 learns to directly predict the multi-joint 3D human pose in a group-wise fashion. This is achieved by a grouped matching strategy during model training.

The group matching strategy is as follows. Given the predicted 3D joint positions $\{y_m\}_{m=1}^M \subset R^3$ and associated confidence scores $\{s_m\}_{m=1}^M$, every consecutive J-joint predictions were grouped into per person pose estimation $\{Y_n\}_{n=1}^N \subset R^{J \times 3}$, and their corresponding confidence scores averaged to obtain the per-person confidence scores $\{p_n\}_{n=1}^N$. The same grouping strategy is used during inference.

The ground truth set Y* of 3D poses of different person instances is smaller than the prediction set of size N, which is padded to size N with empty element $\emptyset$. A bipartite matching between the prediction set and the ground truth set is found by searching for a permutation of $\hat{\sigma} \in \aleph_N$ that achieves the lowest matching cost:

$$\hat{\sigma} = \arg\min_{\sigma \in \aleph_N} \sum_{n=1}^{N} \mathcal{L}_{match}(Y_n^*, Y_{\sigma(n)}) \quad (5)$$

The regressed 3D joint position and confidence score were both considered for the matching cost:

$$\mathcal{L}_{match}(Y_n^*, Y_{\sigma(n)}) = -p_i + \mathcal{L}_1(Y_n^*, Y_{\sigma(n)}) \quad (6)$$

Where $Y_n^* \neq \emptyset$, and $\mathcal{L}_1$ computes the loss error. Following [3, 34], the Hungarian algorithm [22] is employed to compute the optimal assignment $\hat{\sigma}$ with the above matching cost.

Objective Function—The Hungarian loss with the obtained optimal assignment $\hat{\sigma}$ is computed:

$$\mathcal{L}_{Hungarian}(Y^*, Y) = \sum_{n=1}^{N} \left[ \mathcal{L}_{conf}\left(Y_n^*, p_{\hat{\sigma}(n)}\right) + 1_{\{Y_n^* \neq \phi\}} \lambda \mathcal{L}_{pose}\left(Y_n^*, Y_{\hat{\sigma}(n)}\right) \right] \quad (7)$$

Here $\mathcal{L}_{conf}$ and $\mathcal{L}_{pose}$ are losses for confidence score and pose regression, respectively. $\lambda$ balances the two loss terms. Focal loss was used for confidence prediction which adaptively balances the positive and negative samples. For pose regression, $L_1$ loss for 3D joints and their projected 2D joints in different views was computed. To learn multi-layer progressive regression, the above matching and loss are applied for each decoder layer. The total loss is thus $\mathcal{L}_{total} = \sum_{i=1}^{L} \mathcal{L}_{Hungarian}^l$, where $\mathcal{L}_{Hungarian}^l$ denotes loss of the 1-th decoder layer and L is the number of decoder layers. When extending neural network system 101 to body mesh recovery, $L_1$ loss for 3D joints from the SMPL model and their 2D projections was applied, as well as an adversarial loss following HMR [20, 15, 42] due to lack of GT SMPL parameters.

Experiments: Extensive experiments were performed on several benchmark datasets.

Datasets: Panoptic [18] is a large-scale benchmark with 3D skeleton joint annotations. It captures daily social activities in an indoor environment. Extensive experiments were conducted on Panoptic. Following VoxelPose [35], the same data sequences were used except '160906_band3' in the training set due to broken images. Unless otherwise stated, five HD cameras (3, 6, 12, 13, 23) were used in the experiments. All results reported in the experiments follow the same data setup. Average Precision (AP) and Recall [35] were used, as well as Mean Per Joint Position Error (MPJPE) as evaluation metrics. Shelf and Campus [1] are two multi-person datasets capturing indoor and outdoor environments, respectively. They were split into training and testing sets following [1, 6, 35]. Percentage of Correct Parts (PCP) for these two datasets were reported.

Implementation Details: Following VoxelPose [35], a pose estimation model [40] build upon ResNet-50 [11] was adopted for multi-view image features extraction. Unless otherwise stated, a stack of six transformer decoder layers was used. The model is trained for 40 epochs, with the Adam optimizer of learning rate $10^{-4}$. During inference, a confidence threshold of 0.1 is used to filter out redundant predictions.

Main results: Neural network system 101 (henceforth referred to as the MvP model) was first evaluated on the challenging Panoptic dataset and compared with the state of the art VoxelPose model [35]. As shown in Table 1 in FIG. 8, MvP achieves 92.3 $AP_{25}$, improving upon VoxelPose by 9.8%, and achieves much lower MPJPE (15.8 vs 17.8). Moreover, MvP only requires 170 ms to process a multi-view input, about 2× faster than VoxelPose. Averaged per-sample inference time in millisecond on Panoptic test set was counted. For all methods, the time is counted on GPU Geforce RTX 2080 Ti and CPU Intel i7-6900K @ 3.20 GHz.

Figure 9:
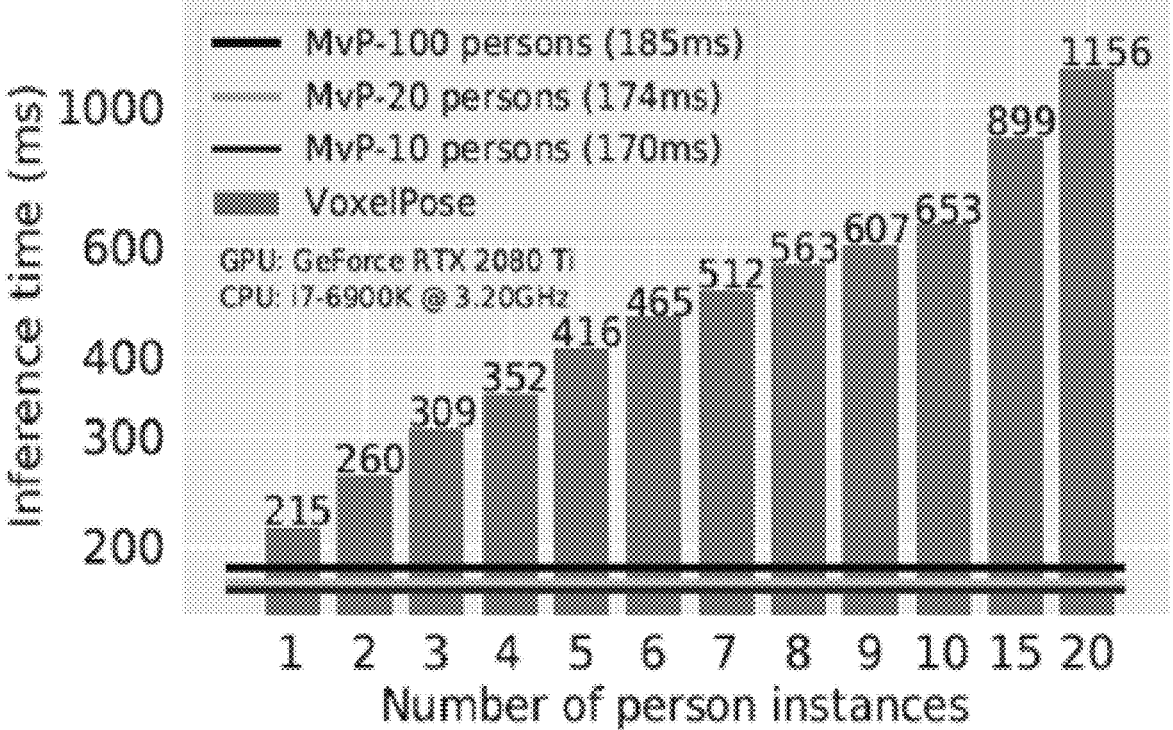
FIG. 9 shows a graph which depicts the inference time versus the number of person instances for the MvP model and the VoxelPose model.

These results demonstrate both accuracy and efficiency advantages of MvP from estimating 3D poses of multiple persons in a direct regression paradigm. To further demonstrate the efficiency of MvP, its inference time when processing different number of person instances was compared with VoxelPose's. FIG. 9 shows the Inference time versus the number of person instances. As shown in FIG. 9, the inference time of VoxelPose grows linearly with the number of person in the scene due to per person regression paradigm. In contrast, MvP keeps constant inference time no matter how many instances in the scene. Benefiting from its direct inference framework, MvP maintains almost constant inference time regardless of the number of persons. Notably, it takes only 185 ms for MvP to process scenes even with 100 person instances, demonstrating its great potential to handle crowded scenarios.

MvP was also compared with the state of the art approaches on the Shelf and Campus datasets. The reconstruction-based methods [2, 8, 6] use 3D pictorial model [2, 6] or conditional random field [8] within a multi-stage paradigm; and the volumetric approach VoxelPose [35] highly relies on computationally intensive intermediate tasks. As shown in Table 2 in FIG. 10, MvP achieves the best performance in all the actors on the Shelf dataset. Moreover, it obtains a comparable result on the Campus dataset as VoxelPose [35] without relying on any intermediate task. These results further confirm the effectiveness of MvP for estimating 3D poses of multiple persons directly.

As mentioned above, updated feature representations $\hat{Z}_v$ have multi-view geometric information (i.e. camera ray directions) encoded into the image feature representations. Tests were also performed to demonstrate the significance of using updated feature representations $\hat{Z}_v$ (henceforth referred to as RayConv). As shown in Table 3a in FIG. 11, if removing RayConv, the performance drops significantly: a 4.8 decrease in $AP_{25}$ and 1.6 increase in MPJPE. This indicates that the multi-view geometrical information is important for the model to more precisely localize the skeleton joints in 3D space. Without RayConv, the decoder cannot accurately capture positional information in 3D space, resulting in a performance drop.

As mentioned above, joint query embeddings which comprise the hierarchical embedding of joint queries and person queries that encode a person-joint relation were used. Tests were also performed to demonstrate the significance of using the hierarchal query embeddings. As shown in Table 3b in FIG. 11, compared with the straightforward and unstructured per-joint query embedding scheme, the hierarchal query embedding (denoted as "Hier" in Table 3b) boosts the performance sharply—15.1 increase in $AP_{25}$ and 21.7 decrease in MPJPE. Its advantageous performance clearly verifies introducing the person-level queries to collaborate with the joint-level queries can better exploit human body structural information and improve the model to better localize the joints. Adding the query adaption scheme (i.e, augmented joint query embeddings as discussed above) to the hierarchal query embeddings (denoted as "Hier+ad." in Table 3b) further improves the performance significantly, reaching $AP_{25}$ of 92.3 and MPJPE of 15.8. This shows the proposed approach effectively adapts the query embeddings to the target scene and such adaptation is indeed beneficial for the generalization of the MvP model to novel scenes.

Confidence Threshold: During inference, a confidence threshold is used to filter out the low-confidence and erroneous pose predictions, and obtain the final result. Adopting a higher confidence will select the predictions in a more restrictive way. A shown in Table 3c of FIG. 11, a higher confidence threshold brings lower MPJPE as it selects more predictions; but it also filters out some true positive predictions and thus reduces the average precision.

Number of Decoder Layers: Decoder layers are used for refining the pose estimation. Stacking more decoder layers thus gives better performance (as per Table 3d of FIG. 11). For instance, the MPJPE is as high as 49.6 when using only two decoder layers, but it is significantly reduced to 22.8 when using three decoder layers. This clearly justifies that the progressive refinement strategy of the MvP model is effective. However, the benefit of using more decoder layers diminishes when the number of layers is large enough, implying the model has reached the ceiling of its model capacity.

Number of Camera Views: Multi-view inputs provide complementary information to each other which is extremely useful when handling some challenging environment factors in 3D pose estimation like occlusions. The number of camera views were varied to examine whether MvP can effectively fuse and leverage multi-view information to continuously improve the pose estimation quality (as per Table 3e of FIG. 11). As expected, with more camera views, the 3D pose estimation accuracy monotonically increases, demonstrating the capacity of MvP in fusing multi-view information.

Number of Deformable Sampling Points: Table 3f of FIG. 11 shows the effect of the number of deformable sampling points K used in the projective attention. With only one deformable point, MvP already achieves a respectable result, i.e., 88.6 in $AP_{25}$ and 18.2 in MPJPE. Using more sampling points further improves the performance, demonstrating the projective attention is effective at aggregating information from the useful locations. When K=4, the model gives the best result. Further increasing K to 8, the performance starts to drop. It is likely because using too many deformable points introduces redundant information and thus makes the model more difficult to optimize.

Replacing Camera Ray Directions with 2D Spatial Coordinates: MvP encodes camera ray directions into the multiview image feature representations via RayConv. Comparison was also performed with the simple positional embedding baseline that uses 2D coordinates as the positional information to embed, similar to the previous transformer-based models for vision tasks [3, 7]. Specifically, the camera ray directions were replaced with 2D spatial coordinates of the input images in RayConv. These results are shown in Table 4 in FIG. 12.

From Table 4, it can be observed that using the 2D coordinates in RayConv (as opposed to using the camera ray directions as described in some of the above embodiments)

results in a much worse performance, i.e., 83.3 in $AP_{25}$ and 18.1 in MPJPE. This result clearly demonstrates that using such view-agnostic 2D coordinates information cannot well encode multi-view geometrical information into the MvP model, while using camera ray directions can effectively encode the positional information of each view in 3D space, thus leading to better performance.

Replacing Dense Attention with Projective Attention: The effectiveness of the projective attention (as described in some of the above embodiments) was also compared with the dense dot product attention (i.e., conducting attention densely over all spatial locations and camera views for multi-view information gathering). These results are shown in Table 5 of FIG. 13. Using dense attention on the MvP model (referred to as MvP-Dense in Table 5) delivers very poor performance ($AP_{25}$ is 0.0 and MPJPE is 114.5) since it does not exploit any 3D geometries and thus is difficult to optimize. Moreover, such dense dot product attention incurs significantly higher computation cost than projective attention—MvP-Dense costs 31.0 G GPU memory, more than 5 times larger than MvP with the projective attention, which only costs 6.1 G GPU memory.

Quantitative Result: The MvP model was also evaluated on the most widely used single-person dataset Human3.6M [46] collected in an indoor environment. The standard training and evaluation protocol [25, 14, 35] was followed and MPJPE was used as the evaluation metric. The MvP model achieves 18.6 MPJPE which is comparable to state-of-the-art approaches (18.6 versus 17.7 and 19.0) [14, 35].

Qualitative Result: The MvP model was also tested with the Panoptic and Shelf and Campus [1] datasets. It was observed that the MvP model can produce satisfactory 3D pose and body mesh estimations even in cases of strong pose deformations and large occlusion. Moreover, the MvP model is robust even in challenging crowded scenarios, Therefore, neural network system 101 (i.e. the MvP model) as described herein is a direct and efficient model, and addresses the challenging multi-view multi-person 3D human pose estimation problem. Different from existing methods which rely on tedious intermediate tasks, the MvP model substantially simplifies the pipeline into a direct regression one by carefully designing the transformer-alike model architecture with the novel hierarchical joint query embedding scheme and projective attention mechanism.

Extensive experiments as described above had been conducted to verify its superior performance and speed over the well-established baselines. It was empirically found that the MvP model needs sufficient data for model training since it learns the 3D geometry implicitly. Thanks to its efficiency, the MvP model would be scalable to handle very crowded scenes with many persons. Moreover, the framework of the MvP is general and thus extensible to other 3D modeling tasks like dense mesh recovery of common objects.

Unless specifically stated otherwise, and as apparent from the following, it will be appreciated that throughout the present specification, discussions utilizing terms such as "receiving", "identifying", 'initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

REFERENCES

[1] Vasileios Belagiannis, Sikandar Amin, Mykhaylo Andriluka, Bernt Schiele, Nassir Navab, and Slobodan Ilic. 3d pictorial structures for multiple human pose estimation. In CVPR, 2014.

[2] Vasileios Belagiannis, Sikandar Amin, Mykhaylo Andriluka, Bernt Schiele, Nassir Navab, and Slobodan Ilic. 3d pictorial structures revisited: Multiple human pose estimation. IEEE transactions on pattern analysis and machine intelligence, 38(10):1929-1942, 2015.

[3] Nicolas Carion, Francisco Massa, Gabriel Synnaeve, Nicolas Usunier, Alexander Kirillov, and Sergey Zagoruyko. End-to-end object detection with transformers. In ECCV, 2020.

[4] He Chen, Pengfei Guo, Pengfei Li, Gim Hee Lee, and Gregory Chirikjian. Multi-person 3d pose estimation in crowded scenes based on multi-view geometry. In ECCV, 2020.

[5] Jifeng Dai, Haozhi Qi, Yuwen Xiong, Yi Li, Guodong Zhang, Han Hu, and Yichen Wei. Deformable convolutional networks. In ICCV, 2017.

[6] Junting Dong, Wen Jiang, Qixing Huang, Hujun Bao, and Xiaowei Zhou. Fast and robust multi-person 3d pose estimation from multiple views. In CVPR, 2019.

[7] Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An image is worth 16×16 words: Transformers for image recognition at scale. arXiv, 2020.

[8] Sara Ershadi-Nasab, Erfan Noury, Shohreh Kasaei, and Esmaeil Sanaei. Multiple human 3d pose estimation from multiview images. Multimedia Tools and Applications, 77(12): 15573-15601, 2018.

[9] Kehong Gong, Jianfeng Zhang, and Jiashi Feng. Poseaug: A differentiable pose augmentation framework for 3d human pose estimation. In CVPR, 2021.

[10] Richard Hartley and Andrew Zisserman. Multiple View Geometry in Computer Vision. Cambridge University Press, New York, NY, USA, 2 edition, 2003.

[11] Kaiming He, Xiangyu Zhang, Shaoqing Ren, and Jian Sun. Deep residual learning for image recognition. In CVPR, 2016.

[12] Yihui He, Rui Yan, Katerina Fragkiadaki, and Shoou-I Yu. Epipolar transformers. In CVPR, 2020.

[13] Congzhentao Huang, Shuai Jiang, Yang Li, Ziyue Zhang, Jason Traish, Chen Deng, Sam Ferguson, and Richard Yi Da Xu. End-to-end dynamic matching network for multi-view multi-person 3d pose estimation. In ECCV, 2020.

[14] Karim Iskakov, Egor Burkov, Victor Lempitsky, and Yury Malkov. Learnable triangulation of human pose. In ICCV, 2019.

[15] Wen Jiang, Nikos Kolotouros, Georgios Pavlakos, Xiaowei Zhou, and Kostas Daniilidis. Coherent reconstruction of multiple humans from a single image. In CVPR, 2020.

[16] Yifan Jiang, Shiyu Chang, and Zhangyang Wang. Transgan: Two transformers can make one strong gan. arXiv, 2021.

[17] Hanbyul Joo, Hao Liu, Lei Tan, Lin Gui, Bart Nabbe, Iain Matthews, Takeo Kanade, Shohei Nobuhara, and Yaser Sheikh. Panoptic studio: A massively multiview system for social motion capture. In ICCV, 2015.

[18] Hanbyul Joo, Tomas Simon, Xulong Li, Hao Liu, Lei Tan, Lin Gui, Sean Banerjee, Timothy Godisart, Bart Nabbe, Iain Matthews, et al. Panoptic studio: A massively multiview system for social interaction capture. IEEE transactions on pattern analysis and machine intelligence, 41(1): 190-204, 2017.

[19] Abdolrahim Kadkhodamohammadi and Nicolas Padoy. A generalizable approach for multi-view 3d human pose regression. Machine Vision and Applications, 32(1): 1-14, 2021.

[20] Angjoo Kanazawa, Michael J. Black, David W. Jacobs, and Jitendra Malik. End-to-end recovery of human shape and pose. In CVPR, 2018.

[21] Sven Kreiss, Lorenzo Bertoni, and Alexandre Alahi. Pifpaf: Composite fields for human pose estimation. In CVPR, 2019.

[22] Harold W Kuhn. The hungarian method for the assignment problem. Naval research logistics quarterly, 2(1-2): 83-97, 1955.

[23] Tsung-Yi Lin, Priya Goyal, Ross Girshick, Kaiming He, and Piotr Dollár. Focal loss for dense object detection. In ICCV, 2017.

[24] Matthew Loper, Naureen Mahmood, Javier Romero, Gerard Pons-Moll, and Michael J Black. Smpl: A skinned multi-person linear model. ACM transactions on graphics (TOG), 34(6): 1-16, 2015.

[25] Julieta Martinez, Rayat Hossain, Javier Romero, and James J Little. A simple yet effective baseline for 3d human pose estimation. In ICCV, 2017.

[26] Dushyant Mehta, Srinath Sridhar, Oleksandr Sotnychenko, Helge Rhodin, Mohammad Shafiei, Hans-Peter Seidel, Weipeng Xu, Dan Casas, and Christian Theobalt. Vnect: Real-time 3d human pose estimation with a single rgb camera. ACM Trans. on Graphics, 36(4):44, 2017.

[27] Xuecheng Nie, Jianfeng Zhang, Shuicheng Yan, and Jiashi Feng. Single-stage multi-person pose machines. In ICCV, 2019.

[28] George Papandreou, Tyler Zhu, Liang-Chieh Chen, Spyros Gidaris, Jonathan Tompson, and Kevin Murphy. Personlab: Person pose estimation and instance segmentation with a bottom-up, part-based, geometric embedding model. In ECCV, 2018.

[29] Georgios Pavlakos, Xiaowei Zhou, Konstantinos G Derpanis, and Kostas Daniilidis. Harvesting multiple views for marker-less 3d human pose annotations. In CVPR, 2017.

[30] Alin-Ionut Popa, Mihai Zanfir, and Cristian Sminchisescu. Deep multitask architecture for integrated 2d and 3d human sensing. In CVPR, 2017.

[31] Haibo Qiu, Chunyu Wang, Jingdong Wang, Naiyan Wang, and Wenjun Zeng. Cross view fusion for 3d human pose estimation. In ICCV, 2019.

[32] Edoardo Remelli, Shangchen Han, Sina Honari, Pascal Fua, and Robert Wang. Lightweight multi-view 3d pose estimation through camera-disentangled representation. In CVPR, 2020.

[33] Xiao Sun, Bin Xiao, Fangyin Wei, Shuang Liang, and Yichen Wei. Integral human pose regression. In ECCV, 2018.

[34] Ilya Sutskever, Oriol Vinyals, and Quoc V Le. Sequence to sequence learning with neural networks. arXiv, 2014.

[35] Hanyue Tu, Chunyu Wang, and Wenjun Zeng. Voxelpose: Towards multi-camera 3d human pose estimation in wild environment. In ECCV, 2020.

[36] Ashish Vaswani, Noam Shazeer, Niki Parmar, Jakob Uszkoreit, Llion Jones, Aidan N Gomez, Lukasz Kaiser, and Illia Polosukhin. Attention is all you need. arXiv, 2017.

[37] Yuqing Wang, Zhaoliang Xu, Xinlong Wang, Chunhua Shen, Baoshan Cheng, Hao Shen, and Huaxia Xia. End-to-end video instance segmentation with transformers. arXiv, 2020.

[38] Felix Wu, Angela Fan, Alexei Baevski, Yann N Dauphin, and Michael Auli. Pay less attention with lightweight and dynamic convolutions. arXiv, 2019.

[39] Zhanghao Wu, Zhijian Liu, Ji Lin, Yujun Lin, and Song Han. Lite transformer with long-short range attention. arXiv, 2020.

[40] Bin Xiao, Haiping Wu, and Yichen Wei. Simple baselines for human pose estimation and tracking. In ECCV, 2018.

[41] Jianfeng Zhang, Xuecheng Nie, and Jiashi Feng. Inference stage optimization for cross-scenario 3d human pose estimation. In NeurIPS, 2020.

[42] Jianfeng Zhang, Dongdong Yu, Jun Hao Liew, Xuecheng Nie, and Jiashi Feng. Body meshes as points. In CVPR, 2021.

[43] Hengshuang Zhao, Jiaya Jia, and Vladlen Koltun. Exploring self-attention for image recognition. In CVPR, 2020.

[44] Xingyi Zhou, Qixing Huang, Xiao Sun, Xiangyang Xue, and Yichen Wei. Towards 3d human pose estimation in the wild: a weakly-supervised approach. In ICCV, 2017.

[45] Xizhou Zhu, Han Hu, Stephen Lin, and Jifeng Dai. Deformable convnets v2: More deformable, better results. In CVPR, 2019.

[46] Diederik P Kingma and Jimmy Ba. Adam: A method for stochastic optimization. In ICCV, 2015.

[47] Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. In NeurIPSw, 2017.

The invention claimed is:

1. A system comprising one or more computers and one or more storage devices storing instructions that, when executed by the one or more computers, cause the one or more computers to implement a neural network system for predicting 3D poses of a plurality of persons in a scene based on 2D input images, each of the 2D input images obtained from a different camera view, the different camera views capturing a visual of the plurality of persons in a scene from different perspectives;

the neural network system comprising an encoder neural network and a decoder neural network, the encoder neural network configured to extract multi-view image features from the 2D input images, the decoder neural network configured to receive the multi-view image features as input, and predict 3D joint locations of each of the plurality of persons;

wherein the decoder neural network comprises decoder layers to regressively refine the predicted 3D joint locations, and wherein each of the decoder layers comprises a projective-attention mechanism, the projective-attention mechanism configured to:

determine a 2D projection of a predicted 3D joint location for each of the different camera views, wherein the predicted 3D joint location is obtained from a preceding decoder layer or is determined by linear methods based on input joint queries;

assign the 2D projection as an anchor point for each of the different camera views;

apply an adaptive deformable sampling strategy to gather localized context information of the different camera views to learn deformable offsets, and based on the deformable offsets, determine the deformable points for each of the anchor points;

generate attention weights based on the multi-view image features at the anchor points; and apply the attention weights to aggregate the multi-view image features at the deformable points.

2. The system of claim 1 wherein the input joint queries are joint query embeddings, the joint query embeddings comprising hierarchical embedding of joint queries and person queries that encode a person-joint relation; and wherein each of the decoder layers further comprises a self-attention mechanism configured to perform self-attention on the joint query embeddings.

3. The system of claim 2 wherein the joint query embeddings are augmented with scene level information that are specific to each of the 2D input images.

4. The system of claim 1 further comprising a positional encoder, the positional encoder configured to encode the camera ray directions for each of the different camera views into the multi-view image features.

5. The system of claim 4 wherein the camera ray directions are generated with camera parameters of the different camera views; and wherein encoding the camera ray directions for each of the different camera views into the multi-view image features comprises concatenating channel-wisely the camera ray directions to the corresponding image features, and applying a standard convolution to obtain updated image representations.

6. The system of claim 5 wherein the projective-attention mechanism is further configured to: receive the updated image representations as input;

generate attention weights based on the updated image representations at the anchor points; and apply the attention weights to aggregate the updated image representations at the deformable points.

7. The system of claim 1 wherein each of the decoder layers further comprises a feed forward network block, the feed forward network block configured to apply feed-forward regression to predict the 3D joint locations, and confidence scores of the predicted 3D joint locations.

8. The system of claim 1 wherein the decoder neural network comprises at least four decoder layers.

9. The system of claim 1 wherein the encoder neural network comprises a convolutional neural network or a transformer based component.

* * * * *